Aug. 31, 1954

W. V. STONE 2,687,573

DENTAL MATRIX RETAINER

Filed May 14, 1952

INVENTOR.
Walter V. Stone
BY
ATTORNEY.

Patented Aug. 31, 1954

2,687,573

UNITED STATES PATENT OFFICE 2,687,573

DENTAL MATRIX RETAINER

Walter V. Stone, Topeka, Kans.

Application May 14, 1952, Serial No. 287,697

5 Claims. (Cl. 32—63)

This invention relates to dental matrix retainers and refers more particularly to a dental matrix retainer having a pivoted or swivel-mounted guide plate for the matrix loop mounted thereon.

Dental matrixes are bands of metal designed to be gripped around a tooth which is being filled to maintain the filling material in the tooth cavity in proper position as the dentist forms it into an integral unit with the tooth. A matrix retainer is a device designed to enable the matrix band to be tightened and loosened at will around the tooth and to hold the band in a fixed position around the tooth.

Due to the relatively small size of human teeth both the matrix band and the retainer are also small in size. This fact requires a good deal of manual dexterity on the part of the dentist. Other factors such as working within the effective time of an anesthetic and the general desirability of speed in dental work due to emotional tension on the part of the patient add to the need for mechanical simplicity in the structure and operation of a matrix retainer.

A matrix band is usually formed so that the part of the loop surrounding the tooth next to the gingival area has a lesser diameter than the part of the loop about the occlusal area. This is due to the fact that the tooth is usually larger in diameter at the occlusal portion than at the gingival portion and also permits the achievement of a greater packing force at the base of the filling which prevents the filling material from leaking out as it is compacted.

This form of the matrix band often creates a problem when it is desirable either to shift the position of the matrix retainer from one side to the other of a given tooth or to apply the band to another tooth in the opposite side of the same jaw or another tooth in the same side of the opposite jaw; for example, from a tooth on the left side of the mandible to a tooth on the left side of the maxilla, or from a tooth on the left side of the mandible to a tooth on the right side of the mandible. In any of these cases, the matrix band must usually be removed from the tooth and the retainer and then readjusted in relation to the retainer guide and reinserted in the retainer. This operation is inconvenient, requiring time, patience and great manual dexterity at a time when all are at a premium.

Therefore it is an object of my invention to provide a matrix retainer which requires a minimum of time and manual dexterity on the part of the dentist in its operation.

A further object is to provide a matrix retainer which may be shifted upon the tooth being filled without removing the band from the tooth or the retainer.

A further object is to prove a matrix retainer which may be moved from any tooth in either jaw to any other tooth in either jaw without removing the matrix band from the retainer.

A further object is to provide a matrix retainer in which the matrix band is loaded into the matrix retainer in only one position, thus permitting relatively unskilled individuals, such as office assistants in a dentist's office, to prepare the retainer for use.

Other and further objects of this invention will appear from the following description.

In the accompanying drawings, which form a part of the instant specification and are to be read in conjunction therewith, there is shown embodiments of the invention, and in the various views like reference numerals are used to indicate like parts.

Figure 1:
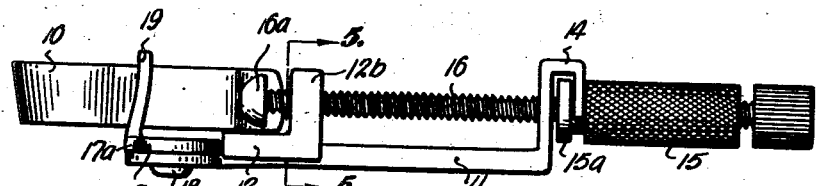
Fig. 1 is a side view of a matrix retainer embodying the invention.
Figure 2:
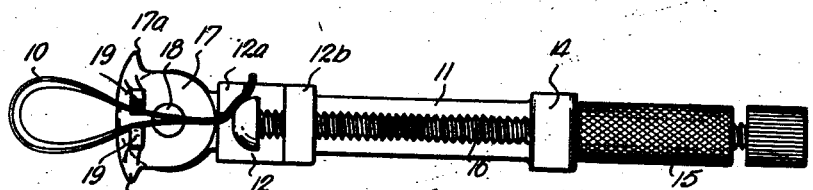
Fig. 2 is a plan view of the retainer shown in Fig. 1.

In the drawings, the numeral 10 refers to a matrix band which is shown in the various figures gripped by a matrix retainer. Movably mounted on the matrix retainer frame 11 is a block 12 which has a frontal bearing boss 12a and a rear screw guide 12b, the latter perforated by a threaded hole 13. The rear end of frame 11 is doubled back into a U-shaped screw support 14 which has an opening 14a in the arm next to the frame. A sleeve 15 having a circumferential groove near its forward end 15a and a threaded bore engages screw support 14 with end 15a. A screw 16 having a head 16a fixed to the front end thereof is threaded through the sleeve 15 and opening 14a and hole 13 in the screw guide 12b of block 12.

Figure 3:
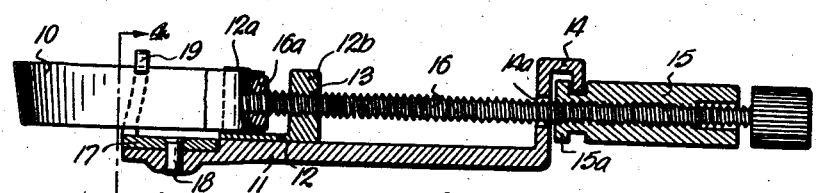
Fig. 3 is a side view of the retainer in Fig. 1 with parts in section.
Figure 4:
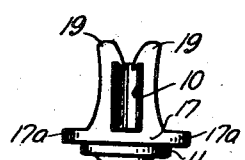
Fig. 4 is a view taken along the lines 4—4 in Fig. 3 in the direction of the arrows.
Figure 5:
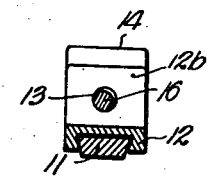
Fig. 5 is a view taken along the lines 5—5 in Fig. 1 in the direction of the arrows.

In the drawings, there is shown a preferred and a modified form of guide plate mounted on the end of frame 11. In Figures 1, 2, 3 and 4 is shown the preferred form of guide plate 17 pivoted to the frame by stud 18. The rear of the guide plate 17 is rounded, while on the two front corners are two tits 17a. Also affixed to the front of table 17 are two vertical hook-shaped gripping guides 19. As seen from the side as shown in Figs. 1 and 3, these guides are curved to better fit the outline of the tooth.

Figure 6:
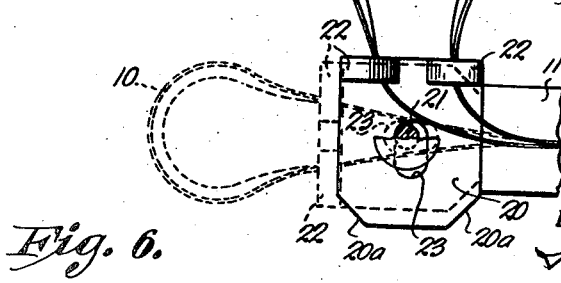
Fig. 6 is a plan view of the modified form of the guide plate indicated in two alternate positions.

The modified form of guide plate 20 is shown in Fig. 6 pivoted to frame 11 by stud 21. This plate also has on its front side two vertical hook-shaped gripping guides 22. In the center of plate 20 running perpendicular to the front side is a slot 23 which surrounds the shaft of stud 19. The rear corners of the plate are beveled as shown at 20a.

In operation, with either form of guide plate, the matrix 10 is bent so that the two ends are together. With the loop side of smallest diameter towards the frame 11, the body of the matrix is pressed down between the gripping guides 19 or 22 and simultaneously the matrix ends are inserted between boss 12a and screwhead 16a. Screw 16 is then turned clockwise by rotating the knurled head until screwhead 16a tightly wedges the ends of the matrix against boss 12a. Sleeve 15 is rotated clockwise or counterclockwise until the desired size of the matrix loop extends beyond guides 20 or 22 for easy placement over a tooth.

The matrix is usually placed over a tooth with the guide plate approximately in central position with respect to the frame. Then, depending on in what position the dentist desires the matrix retainer to extend from the tooth and which jaw and side of the jaw the tooth is in, the guide plate may then be rotated to either left or right positions.

Referring to the preferred form of guide plate, once the matrix band has been fitted around the tooth and before it is tightened, by simply rotating the frame in either direction the retainer may be moved either to the left or the right and placed in any desired position relative to the tooth which the dentist desires. The position of the frame may thus be changed at will. The tits 17a on the front end of the plate limit the rotation either to the left or to the right.

Referring to the modified form of guide plate shown in Fig. 6, the plate 20 has three positions—right, left and central. Assuming the matrix to have been placed on a tooth with the guide plate in the central position, to change the position of the plate, the dentist pulls the plate forward until the stud 21 abuts the rear of slots 23. Due to the beveled corners 20a on the rear of the plate, the table may then be turned either to the left or the right as desired and when it has been turned through the full right or left angle, it locks firmly in that position if it is pushed slightly back on its own axis. The matrix in any of these three positions may be then fitted over the tooth. To change the position of the retainer relative to the tooth, sleeve 15 is rotated counterclockwise which pushes block 12 forward on the frame thus loosening the matrix around the tooth. If plate 20 is in either the left or right position, when pushed slightly forward it unlocks and then it may be rotated to another position.

With either form of guide plate, to place the matrix on another tooth in either jaw, the matrix is loosened around the first tooth by counterclockwise rotation of sleeve 16. The matrix is then removed from the tooth. If the second tooth is an opposite tooth in the same jaw, or a corresponding tooth in the opposite jaw, the guide plate will probably have to be rotated in the opposite direction. However, in no case will it be necessary to remove the matrix band from the retainer. For example, if the matrix is originally fixed on a tooth in the right side of the mandible and it is desired to place it on a tooth in the left side of the mandible, the guide plate is first in the right position. To prepare the retainer for insertion on the second tooth, it is necessary only to turn the guide plate to the left. Likewise, when moving the matrix loop from a tooth in the right side of the mandible to a tooth in the right side of the maxilla.

Thus it is seen that matrix retainers have been provided which greatly reduce the time and skill required in their use and operation.

Matrix retainers have also been provided which permit changing the position of the retainer in relation to the tooth being filled without removing the matrix.

Matrix retainers have also been provided which may be moved from any tooth in either jaw to any other tooth in either jaw without removing the matrix band from the retainer.

From the foregoing it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

I claim:

1. A dental matrix retainer including a frame, a block slidable on said frame, a screw and sleeve assembly carried by the frame and adapted to grip the ends of the matrix in the block and move the block longitudinally of the frame to increase or diminish the size of the matrix loop, a loop-holding guide plate pivoted at one end of the frame and movable on its pivot to adjust the matrix loop in any position throughout an arc of at least 270°.

2. A dental matrix retainer including a frame, a block slidable on said frame with a bearing boss and a screw guide, a screw and sleeve assembly carried by the frame and screw guide adapted to grip the ends of the matrix against the bearing boss and move the block longitudinally of the frame to increase or diminish the size of the matrix loop, and loop-holding guide members mounted on the end of said frame, the loop-holding guide members mounted on a guide plate pivoted at one end of the frame and movable on its pivot to adjust the matrix loop in any position throughout an arc of at least 270°.

3. A dental matrix retainer including a frame, a block slidable on said frame, a screw and sleeve assembly carried by the frame and adapted to grip the ends of the matrix in the block and move the block longitudinally of the frame to increase or diminish the size of the matrix loop, a loop-holding guide plate pivoted at one end of the frame and movable on its pivot to adjust the matrix loop in selected positions throughout an arc of at least 270°.

4. A matrix retainer as in claim 3 wherein the pivot for the guide plate comprises a slot centrally of said plate and extending longitudinally thereof, said slot encircling a stud affixed to the frame.

5. A matrix retained as in claim 3 wherein the pivot of the guide plate comprises a slot centrally of said plate and extending longitudinally thereof, said slot encircling a stud affixed to the frame, the rear corners of the guide plate being beveled.

References Cited in the file of this patent

UNITED STATES PATENTS

| Number | Name | Date |
|---|---|---|
| 758,619 | Leffingwell | Mar. 21, 1905 |
| 2,374,750 | Ivory | May 1, 1945 |
| 2,572,198 | Reiter | Oct. 23, 1951 |